US008730943B1

(12) United States Patent
Sin et al.

(10) Patent No.: US 8,730,943 B1
(45) Date of Patent: May 20, 2014

(54) SESSION INITIATION PROTOCOL COMMUNICATION WITH ENDPOINTS MANAGED BY A CALL MANAGEMENT SERVER IN A STIMULUS BASED NETWORK

(75) Inventors: Sam K. Sin, San Jose, CA (US); Tarun Loomba, Laguna Hills, CA (US); Tony Wan, Sunnyvale, CA (US); Jan Fandrianto, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1924 days.

(21) Appl. No.: 11/694,736

(22) Filed: Mar. 30, 2007

(51) Int. Cl.
*H04L 12/66* (2006.01)
*H04M 1/56* (2006.01)
*H04L 12/28* (2006.01)

(52) U.S. Cl.
USPC ............... 370/352; 379/142.13; 379/142.14; 370/401

(58) Field of Classification Search
USPC .................. 370/352–356, 401, 467; 379/142.13–142.14
See application file for complete search history.

(56) References Cited

U.S. PATENT DOCUMENTS

| 2005/0031097 | A1* | 2/2005 | Rabenko et al. | 379/93.31 |
| 2006/0187904 | A1* | 8/2006 | Oouchi | 370/352 |
| 2007/0133516 | A1* | 6/2007 | Stein | 370/352 |
| 2008/0123627 | A1* | 5/2008 | Moreman et al. | 370/352 |

OTHER PUBLICATIONS

J. Rosenberg et al.; "SIP: Session Initiation Protocol"; Network Working Group, RFC 3261; Jun. 2002; pp. 1-221.
Beacham et al.; NCS MIB for PacketCable and IPCablecom MTAs; www.ietf.org/internet-drafts/draft-ietf-ipcdn-pktc-signaling-12.txt.; Oct. 2006; pp. 1-67.
E. Nechamkin; "Multimedia Terminal Adapter Management Information Base for PacketCable and IPCablecom-Compliant Devices"; Network Working Group, RFC 4682; Dec. 2006; pp. 1-57.
D. Jones et al.; "The DOCSIS Device Class DHCP Relay Agent Information Sub-Option";Network Working Group; RFC 3256; Apr. 2002; pp. 1-5.

\* cited by examiner

*Primary Examiner* — Asad Nawaz
*Assistant Examiner* — Joel Hamel
(74) *Attorney, Agent, or Firm* — Haynes and Boone, LLP

(57) ABSTRACT

In one embodiment, an apparatus may include a trunk service unit and at least one logical multimedia terminal adapter (L-MTA). The trunk service unit may be configured to provide session initiation protocol (SIP) service to at least one subscriber equipment in a subscriber network. Each subscriber equipment may have an associated subscriber equipment identifier. The trunk service unit may provide subscriber-facing signaling to communicate with the subscriber network and network-facing signaling to communicate with a stimulus-based network. The L-MTA may be associated with the stimulus based network and may be configured to obtain service from a call management server (CMS) in the stimulus-based network. Each L-MTA may have an associated L-MTA equipment identifier, where the network-facing signaling of the trunk service unit being used to control the at least one L-MTA.

20 Claims, 3 Drawing Sheets

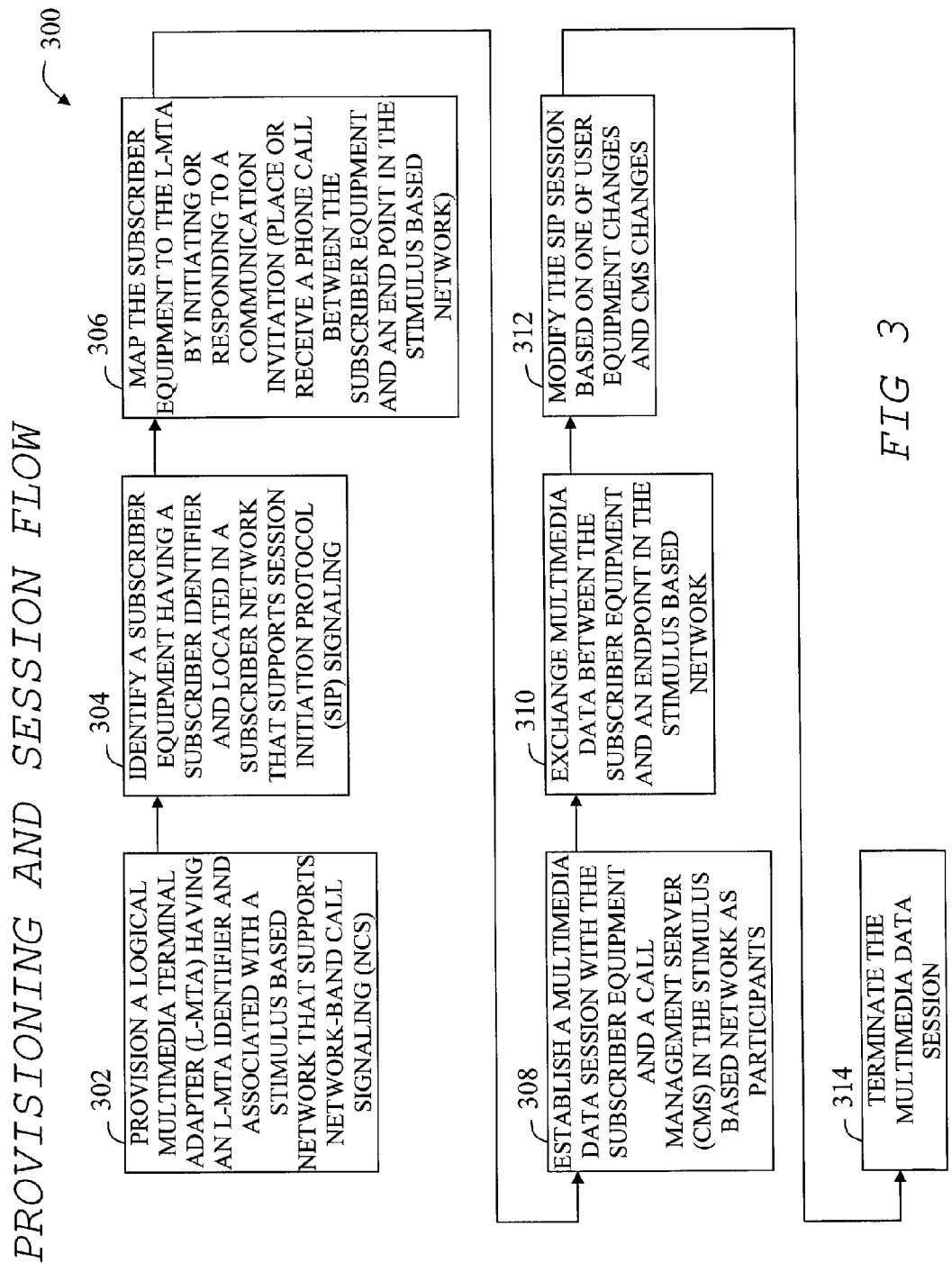

SESSION INITIATION PROTOCOL COMMUNICATION WITH ENDPOINTS MANAGED BY A CALL MANAGEMENT SERVER IN A STIMULUS BASED NETWORK

TECHNICAL FIELD

The present disclosure relates generally to electronic communication.

BACKGROUND

Previously, the only way to deploy an application-layer control protocol service such as Session Initiation Protocol (SIP) within a stimulus-based network was to have a Call Management Server (CMS) support SIP, and provide inter-work SIP line signaling with either Media Gateway Control Protocol (MGCP) trunk signaling or Network-Band Call Signaling (NCS). Enterprise and Service Provider Voice over Internet Protocol (VoIP) deployments are increasingly using SIP, as the session protocol of choice. These sessions may include Internet telephone calls, multimedia distribution, and multimedia conferences.

However, SIP is a text-based protocol, and the parsing and building of messages may put a heavy processing or throughput load on various network elements. As the number of SIP sessions increases, so too the processing load on various devices may also increase. This increase can create a bottleneck in some deployments. Worse, some non-terminal, or intermediately positioned network devices like Session Border Controllers handling SIP-to-SIP calls may actually handle two related instances of SIP sessions, one sending and one receiving, thus leading to a rapid increase in processor and memory utilization. This processing and parsing burden may negatively impact system scalability, and/or reliability. Accordingly, there is a need in the art to provide SIP services that are scalable, reliable, and that reduce the processing load on intermediate network elements.

BRIEF DESCRIPTION OF THE DRAWINGS

FIG. 3 shows a flow diagram that illustrates an example session flow, according to an embodiment.

Embodiments of the present invention and their advantages are best understood by referring to the detailed description that follows. It should be appreciated that like reference numerals are used to identify like elements illustrated in the figures.

DESCRIPTION

Overview

One or more embodiments may provide Session Initiation Protocol (SIP) to Network-Controlled Call Signaling (NCS) inter-working functionality in a gateway device in order to a) provide SIP trunk service to an Internet Protocol (IP) key system, b) emulate multimedia terminal adapter (MTA) to an NCS network, and/or c) leverage PacketCable Dynamic Quality-of-Service (DQoS). Any or all of these may be advantageous by enabling deployment of SIP services at a customer premise, and/or leveraging existing NCS back-office functions including provisioning and billing.

According to one embodiment, an apparatus may include a trunk service unit and at least one logical multimedia terminal adapter (L-MTA). The trunk service unit may be configured to provide session initiation protocol (SIP) service to at least one subscriber equipment in a subscriber network. Each subscriber equipment may have an associated subscriber equipment identifier. The trunk service unit may provide subscriber-facing signaling to communicate with the subscriber network and network-facing signaling to communicate with a stimulus-based network. The L-MTA may be associated with the stimulus based network and may be configured to obtain service from a call management server (CMS) in the stimulus-based network. Each L-MTA may have an associated L-MTA equipment identifier, where the network-facing signaling of the trunk service unit being used to control the at least one L-MTA.

According to another embodiment, a method may include provisioning service with at least one logical multimedia terminal adapter (L-MTA) where each L-MTA may be associated with a subscriber equipment in a subscriber network and each L-MTA has an L-MTA identifier and each subscriber equipment may have a corresponding subscriber equipment identifier. Each L-MTA may be configured to obtain service from a call management server (CMS) in a stimulus based network. The method may include mapping the subscriber equipment to the associated L-MTA, and establishing a communication session between the subscriber equipment in the subscriber network and the CMS in the stimulus based network.

DESCRIPTION OF EXAMPLE EMBODIMENTS

Figure 1:
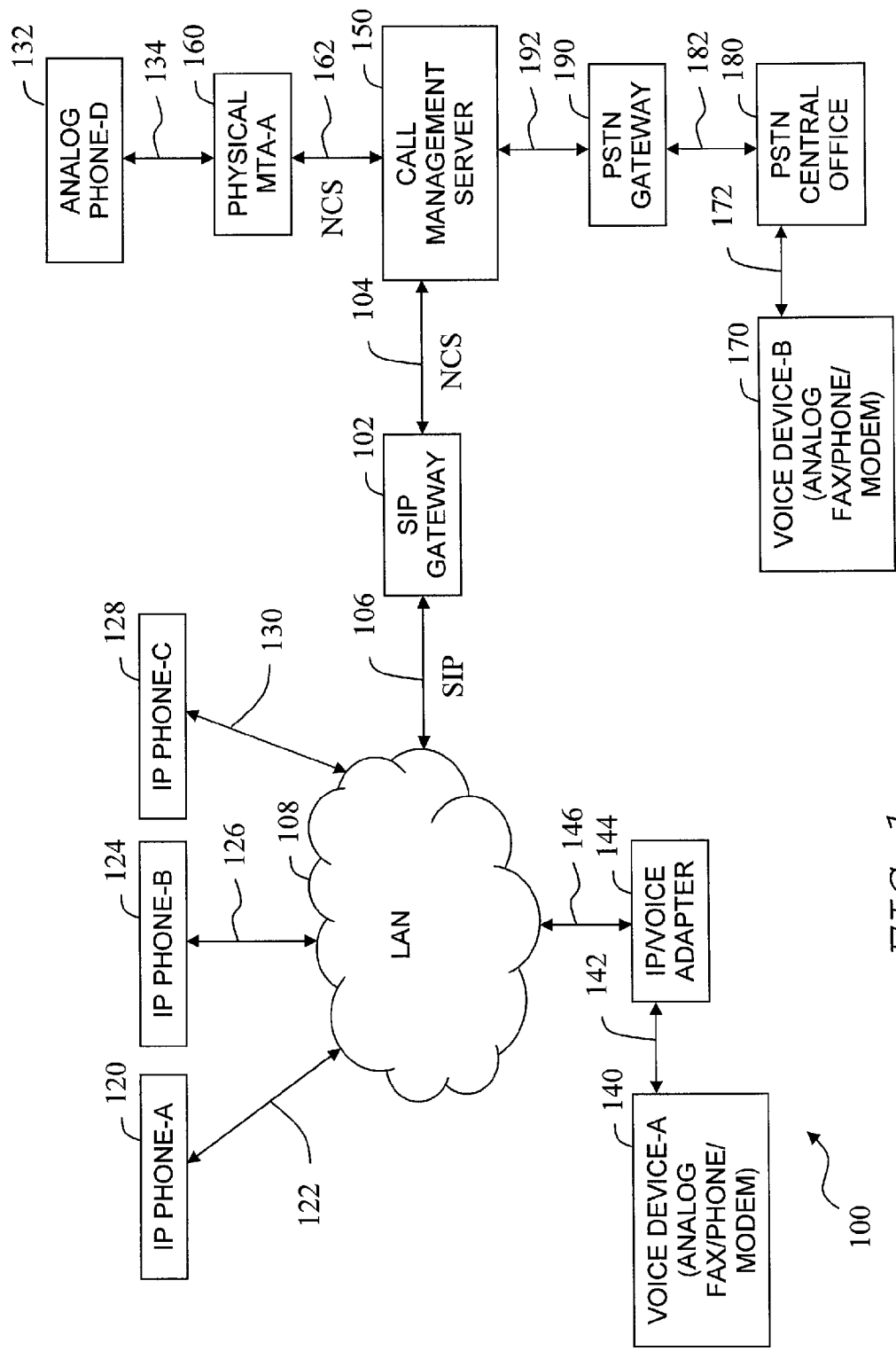
FIG. 1 shows a block diagram view of an example multi-protocol inter-working system, according to an embodiment.

FIG. 1 illustrates an example multi-protocol inter-working system 100, according to an embodiment. System 100 may include a Session Initiation Protocol (SIP) gateway 102 that is configured to communicate using an Network-Controlled Call Signaling (NCS) signaling protocol, or Network-Band Call Signaling protocol, over a first communications link or network 104 and configured to communicate using the SIP signaling protocol over a second communications link or network 106. In this manner, gateway 102 may transfer and/or translate communications traffic between the NCS and SIP signaling protocols so that devices on the NCS side of gateway 102 transmit and receive data using (i.e. "see") only the NCS signaling protocol, while devices on the SIP side of gateway 102 transmit and receive data and see only the SIP signaling protocol. The SIP traffic on link 106 may be exchanged between gateway 102 and a subscriber network 108, or local area network (LAN) 108 that may include one or more network devices. LAN 108 may include voice equipment that ranges from analog telephony adaptor (ATA) and Internet Protocol (IP) phones to complete private branch exchange (PBX) systems for applications including residential, small-office/home-office (SOHO), and small enterprise systems.

There are many different types of network elements that use SIP signaling for Voice over Internet Protocol (VoIP), including telephones, proxies, Internet Protocol Private Branch Exchanges (IP-PBXs), Media Gateway, software bridges (SoftSwitches), Back-to-Back User Agents (B2BUAs), and Session Border Controllers. Some relevant aspects of SIP may be specified by an Internet Engineering Task Force (IETF) document Request For Comments (RFC) 3261, also denoted as IETF-RFC3261, the content of which is hereby incorporated by reference. IETF-RFC3261 describes SIP as "an application-layer control (signaling) protocol for creating, modifying, and terminating sessions with one or more participants. These sessions include Internet telephone calls, multimedia distribution, and multimedia conferences."

Similarly, some relevant aspects of NCS may be specified by a document titled "Network-Based Call Signaling (NCS) MIB for PacketCable and IPCablecom Multimedia Terminal Adapters (MTAs)" and referenced as Internet Engineering Task Force (IETF) published as draft-ietf-ipcdn-pktc-signaling-12.txt, the content of which is hereby incorporated by reference. The document draft-ietf-ipcdn-pktc-signaling-12.txt describes "a portion of the Management Information Base (MIB) for use with network management protocols in the Internet community. In particular, it provides a common data and format representation for PacketCable and IPCablecom compliant Multimedia Terminal Adapter devices." Processing and throughput problems previously made it difficult to deploy SIP services within a stimulus-based network infrastructure such as PacketCable NCS.

There are many applications of the Internet that require the creation and management of a communication session, where a session is considered an exchange of data between an association of participants. Implementation of the various applications is further complicated by the practices of participants; where users may move between endpoints, they may be addressable by multiple names, and they may communicate using several different media types, sometimes simultaneously. Numerous protocols have been authored that carry various forms of real-time multimedia session data such as voice, video, or text messages. The SIP works in concert with these protocols by enabling Internet endpoints (i.e. user agents) to discover one another and to agree on a characterization of a session in which they can participate. For locating prospective session participants, and for other functions, SIP enables the creation of an infrastructure of network hosts (i.e. proxy servers) to which user agents can send registrations, invitations to sessions, and other requests. SIP is an agile, general-purpose tool for creating, modifying and termination sessions, and SIP works independently of underlying transport protocols without dependence on the type of session that is being established.

Referring again to FIG. 1 for one example, LAN 108 may connect to a plurality of Internet Protocol (IP) phones, including an IP Phone-A 120 configured to exchange IP traffic over a network link 122, an IP Phone-B 124 configured to exchange IP traffic over a network link 126, and an IP Phone-C 128 configured to exchange IP traffic over a network link 130. IP traffic may conform to the Transfer Control Protocol/Internet Protocol (TCP/IP), and each of links 122, 126, and 130 may comprise either a fixed-wire or a wireless connection. In this manner, each IP device (120, 124, 128) may transmit and/or receive data according to the IP protocol, and communication may include voice and/or data communication using a Voice over Internet Protocol (VoIP) compliant terminal. As used herein, each IP Phone refers to an SIP enabled IP Phone.

A voice device-A 140 may communicate over a link 142 to an IP/Voice Adapter 144 that may be connected to LAN 108 through a network or link 146. Voice device-A 140 may be a plain old telephone service (POTS) voice-band device such as a facsimile (FAX) machine, an analog modem, or an analog telephone. Adapter 144 may convert voice-band signals on link 142 to data signals on link 146 so that device 140 may communicate over LAN 108. While an IP protocol network is shown for LAN 108, other protocols may be used. Terminal equipment, including devices (120, 124, 128, and 140) may be considered as subscriber or user equipment since a user or service delivery manager of these devices may have setup a subscription for service using the device. SIP gateway 102 may communicate with a call management server (CMS) 150 over link 104 to obtain service. CMS 150 may establish one or more multi-media sessions with one or more LAN 108 devices through gateway 102. More particularly, an analog phone-D 132 may connect over a link 134 to a physical multimedia terminal adapter-A (P-MTA) that is connected through a line package 162 to CMS 150. An traditional P-MTA can include a device that has one or more RJ11 ports where a subscriber may connect a traditional analog telephone to obtain telephone services from a cable operator.

Some relevant aspects of a multimedia terminal adapter (MTA) may be specified by a document titled "Multimedia Terminal Adapter (MTA) Management Information Base for PacketCable- and IPCablecom-Compliant Devices" denoted as IETF-RFC4682, the content of which is hereby incorporated by reference. IETF-RFC4682 describes "A Multimedia Terminal Adapter (MTA) is a PacketCable- or IPCablecom-compliant device providing telephony services over a cable or hybrid system used to deliver video signals to a community. It contains an interface to endpoints, a network interface, CODECs, and all signaling and encapsulation functions required for Voice over IP transport, call signaling, and Quality of Service signaling. An MTA can be an embedded or a standalone device. An Embedded MTA (E-MTA) is an MTA device containing an embedded DOCSIS Cable Modem. A Standalone MTA (S-MTA) is an MTA device separated from the DOCSIS cable modem by non-DOCSIS Message Access Control (MAC) interface (e.g., Ethernet, USB)." Finally, some relevant aspects of a DOCSIS channel may be described by a document titled "The DOCSIS (Data-Over-Cable Service Interface Specifications) Device Class DHCP (Dynamic Host Configuration Protocol) Relay Agent Information Sub-option" and referenced as "IETF-RFC 3256", the entire content of which is hereby incorporated by reference. P-MTA 160 may be connected through a DOCSIS channel to CMS 150, and may implement the NCS multimedia signaling protocol to process events and/or signals associated with an associated line package.

Each L-MTA (204, 210, 216) can be viewed as a P-MTA with each RJ11 port replaced with a logical interface that may be implemented with general purpose hardware and suitably programmed using firmware and/or software. Each L-MTA can thus exchange messages with an external logical object to emulate the signals exchanged between an analog phone and the MTA. As an example, SIP service unit 202 may exchange messages similar to the following with one or more L-MTAs (204, 210, 216) over links (206, 212, 218) respectively.

Examples of such messages from a phone (user device) to SIP service unit 202 can include:
PHONE_OFFHOOK—informs L-MTA the phone is off hook
PHONE_ONHOOK—informs L-MTA the phone is on hook
PHONE_HOOKFLASH—informs L-MTA the phone has a hook flash
PHONE_DTMFx_ON (where x=0, 1, 2, . . . , 9, *, #)—informs L-MTA the digit is on
PHONE_DTMFx_OFF (where x=0, 1, 2, . . . , 9, *, #)—informs L-MTA the digit is off Examples of such messages from an L-MTA to SIP service unit 202 can include:
RINGING—informs service unit 202 that an L-MTA is ringing service unit 202
HANGUP—informs service unit 202 that the connection and/or session is now torn down (i.e. call ended by the network)

DIALTONE—informs service unit 202 that L-MTA is sending a dialtone

BUSYTONE—informs service unit 202 that L-MTA is sending a busytone

As another example, a Voice Device-B 170 may communicate over a link 172 to a public switched telephone network (PSTN) central office 180 that may be connected to a PSTN gateway 190 through a network or link 172. Similarly, PSTN gateway 190 may communicate with CMS 150 through a network or link 192. Voice Device-B 170 may be a facsimile (FAX) machine, analog modem, or an analog telephone. When IP Phone-A 120 is an internet or VoIP telephone and analog phone-D is a traditional analog telephone, a voice communication session may be established between IP Phone-A 120 and analog phone-D 132 where conversion between NCS signaling and SIP signaling is accomplished in SIP gateway 102. When Voice Device-A 140 and Voice Device-B 170 are fax machines, a data communication session may be established between them to send and/or receive faxed documents, as yet another communication session example.

Figure 2:
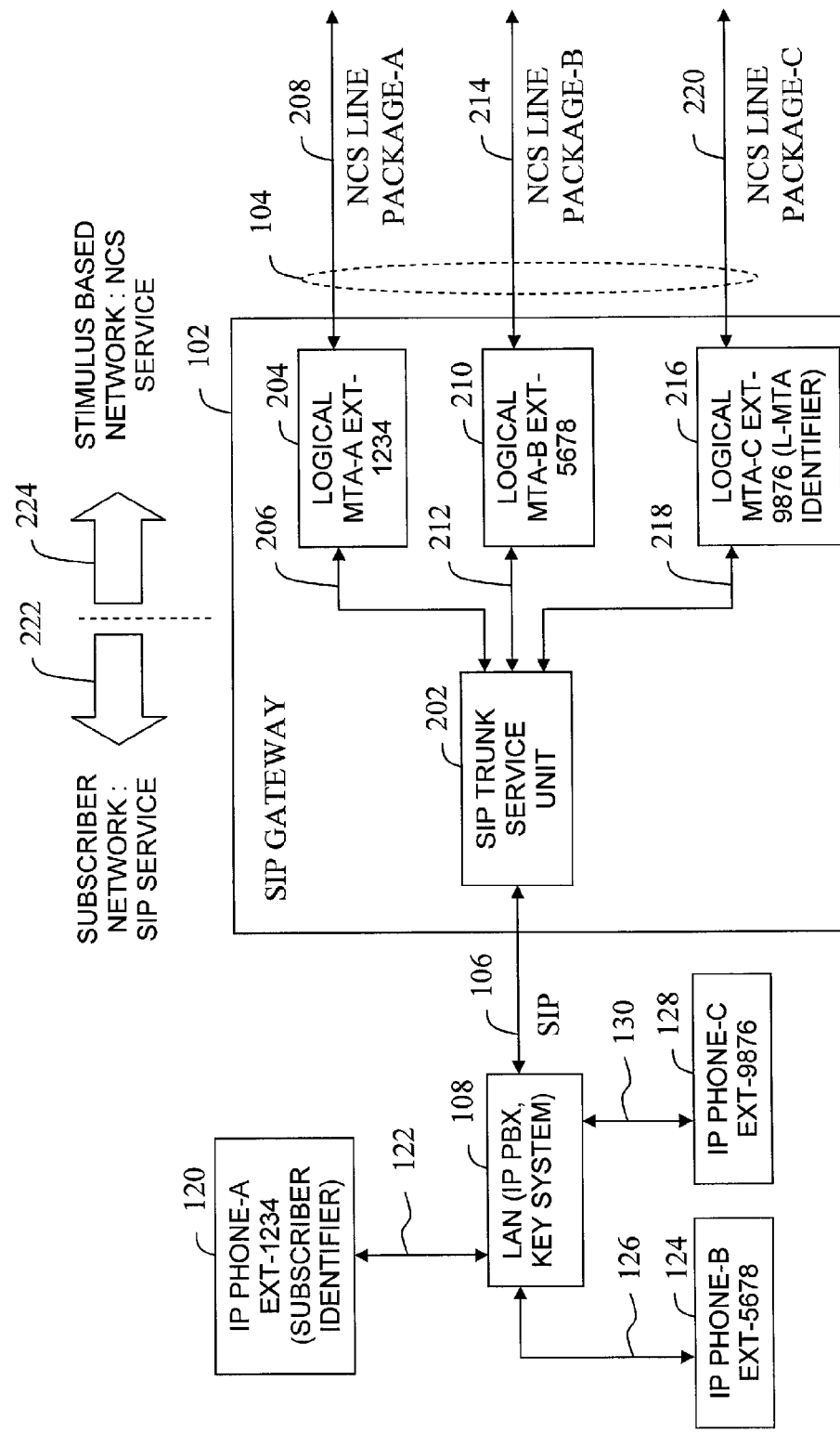
FIG. 2 shows an example trunk service system utilizing a plurality of logical multimedia terminal adapters (L-MTAs), according to an embodiment.

FIG. 2 illustrates an example trunk service system 200 utilizing a plurality of logical multimedia terminal adapters (L-MTAs), according to an embodiment. Gateway 102 may include an SIP trunk service unit 202 and a plurality of L-MTAs, each L-MTA being configured to communicate using NCS signaling over link 104. The plurality of logical MTAs support all signaling functions of a physical MTA including processing the events and/or signals associated with the line package. The number of logical MTAs and the phone extension assignments shown are only examples and are not considered limiting.

An L-MTA-A 204 may be assigned a phone extension Ext-1234, may communicate with SIP trunk service unit 202 over a network or link 206 using SIP signaling, and may communicate with CMS 150 over an NCS line package-A link or network 208 using NCS signaling. Similarly, an L-MTA-B 210 may be assigned a phone extension Ext-5678, may communicate over a network or link 212 using SIP signaling, and may communicate over an NCS line package-B link or network 214 using NCS signaling. Finally, an L-MTA-C 216 may be assigned a phone extension Ext-9876, may communicate over a network or link 218 using SIP signaling, and may communicate over an NCS line package-C link or network 220 using NCS signaling. In this manner, SIP gateway 102 resides on a boundary between subscriber network 222 that supports SIP signaling and stimulus based network 224 that supports NCS signaling.

Any or all of the blocks or functional units in SIP gateway 102 may be implemented using a collaboration between communications hardware, firmware, and/or software, and may include a suitably programmed computer processor configured to fetch, decode, and execute computer instructions and related hardware for performing some or all of the operations as herein described. For example, a microprocessor may fetch, decode, and execute computer instructions to retrieve, process, and/or store data to implement some or all of the described functions either alone or in combination with special-purpose communication hardware. In this manner, a logical MTA may be implemented by a suitably programmed microprocessor executing a computer program or computer code segment to retrieve, process, and/or store data using associated communications hardware.

LAN 108 may comprise a Key System or an Internet Protocol (IP) based Private Branch Exchange (PBX) system. A Key System may describe a smaller phone system where the phones in the key system may have keys and/or lights that indicate where a phone or line is in use. In a Key System, a phone user may be able to simply press the key for another extension and be immediately connected to that other extension. In contrast, a PBX system may describe a larger phone system where trunk lines may be connected to individual phone lines, and each phone may dial an extension to be connected within LAN 108. A PBX may require fewer trunk lines because it is assumed that not all of the LAN 108 extensions may be in use at one time. In one example, IP Phone-A 120 may be assigned an extension EXT-1234 corresponding to L-MTA-A 204, IP Phone-B 124 may be assigned an extension EXT-5678 corresponding to L-MTA-B 210, and IP Phone-C 128 may be assigned an extension EXT-9876 corresponding to L-MTA-C 216. In this manner, there may be a one-to-one correspondence between the logical MTAs and subscriber equipment in use through SIP gateway 102.

CMS 150 provisions a logical MTA as it would a physical MTA. A cable operator may provision a logical MTA exactly the way they would a regular, physical MTA. The SIP/NCS gateway 102 and the SIP side equipment (120, 124, 128, 144), on the other hand, may require additional provisioning (i.e. configuration) in order for the system to work as a whole.

A session is created when one or more SIP user equipment is mapped to one or more MTA emulators, such that the phone extension of the SIP user equipment is the same as the phone extension assigned by the CMS to the logical MTA. A pool of logical MTAs can be grouped together to present a SIP trunk service towards the subscribers. The SIP user equipment may be controlled by the stimulus-based network by using the network signaling received by the MTA emulator to update the SIP session associated with the SIP user equipment. User-initiated changes to the SIP session are communicated back to the stimulus network via events generated by the logical MTA. The establishment of a session may be based on a request from either the SIP user equipment or CMS 150. In this manner, towards a subscriber the created session is manifested, appears, and/or functions as a SIP trunk service, while towards the stimulus network the session is manifested as one or more logical MTAs. Each logical MTA is configured to obtain service from CMS 150 in the stimulus based network 224. Once a signaling path is established, the media can pass directly from the SIP User Agent to a media termination point in the stimulus network. In this manner, a communication session may be created that appears to a SIP user equipment as a SIP service provider or an SIP trunk service on a first side of gateway 102, and to CMS 150 as one or more MTAs to a Cable voice infrastructure on a second side of gateway 102.

FIG. 3 shows a flow diagram that illustrates an example provisioning and session flow 300, according to an embodiment. In reference to FIGS. 1-3, flow 300 may include provisioning a logical multimedia terminal adapter (L-MTA) (204, 210, 216), each L-MTA having an L-MTA identifier (i.e. extension number) and being associated with a stimulus based network that supports network-band call signaling (NCS) in operation 302. Flow 300 may continue with identifying a subscriber equipment (120, 124, 128) having a subscriber identifier (i.e. extension number) and located in a subscriber network 222 that supports SIP signaling in operation 304. Once an L-MTA and associated subscriber equipment are identified, flow 300 may continue with mapping the subscriber equipment to the associated L-MTA in operation 306 by initiating or responding to a communication invitation (i.e. INVITE) which may be associated with placing or receiving a phone call between the subscriber equipment in the subscriber network 222 and an end point (132, 170) in the stimulus based network 224. The originating or receiving end point may be connected to CMS 150 directly or through another network.

In the mapping process, if there is an L-MTA that corresponds to each phone on the SIP facing side (i.e. each has a direct inward dialing DID number), one-to-one mapping can be configured on the L-MTA and on the IP phone by a user or system administrator. In one example, when a call comes in to the L-MTA from the NCS facing side, the corresponding IP phone will receive the SIP INVITE message from the SIP/NCS gateway. When this same phone places or makes a call, the corresponding L-MTA will be used to signal to the NCS side equipment. Alternatively, it is also possible to have one L-MTA to support multiple phones (indirectly) if the equipment connecting to the SIP facing side of the SIP/NCS gateway is a SIP IP PBX.

Using an example system having three L-MTA associated with gateway 102, mapping rules in gateway 102 can map all three L-MTA to the same SIP IP PBX on the SIP facing side. In a first direction, when calls are received on the mapped L-MTA the SIP IP PBX may apply one or more internal rules to ring one or more of the phones that it serves on the subscriber side network. In a reverse direction, when one of the PBX phones makes a call, the SIP IP PBX may again apply internal rules to choose which L-MTA to send the call through to reach the NCS side infrastructure. Each L-MTA may support one or more simultaneous calls at any time. Hence, more than one subscriber phones can share a single L-MTA.

Once the subscriber equipment is mapped to the corresponding L-MTA, flow 300 may continue with establishing a multimedia data session with the subscriber equipment and a call management server 150 in the stimulus based network 224 as participants in the communication session in operation 308. Once the multimedia data session is established, flow 300 may continue with exchanging multimedia data between the subscriber equipment and the endpoint in the stimulus based network 224 in operation 310. During the multimedia data exchange, either the user equipment or the CMS 150 may alter the SIP session between the user equipment in operation 312. Modifications to the SIP session after the initial call has been established may include: Call Hold, Call Resume, Call End, and/or Call Transfer. For Call Hold, either the NCS side or the SIP side can request the other to place the call on hold. For Call Resume, either the NCS side or the SIP side can resume a call that is on hold. For Call End, either side may terminate the call and tear down the connection. For Call Transfer, either side may initiate a transfer. For the SIP side, Call Transfer may translate into a sequence of messages from service unit 202 to one or more L-MTAs including PHONE_ONHOOK/OFFHOOK, as discussed above. Flow 300 may be terminated when the multimedia data session is terminated or completed in operation 314 by action from the user equipment, the end point in the stimulus based network, or the CMS 150.

Flow 300 includes both provisioning and session establishment, where provisioning may typically be done in a separate process and includes operations 302-304, while session establishment may include operations 306-314. Gateway 102 may be pre-provisioned with proper parameters prior to deployment, while in-service provisioning may also be possible, and even necessary in some situations. One such situation may be when a new configuration is propagated to an existing system, where new or enhanced features are offered by a service provider.

According to particular embodiments, SIP endpoints may communicate with a stimulus-based network and operate as logical extensions of that stimulus-based network by using Logical Multimedia Terminal Adapters (LMTAs) as a part of the SIP trunk. Particular embodiments may also provide one or more communication sessions between SIP user equipment and a Call Management Server (CMS) of a stimulus-based network (e.g. PacketCable NCS, MGCP, etc.). To create a session has a SIP User Agent and a CMS as participants, the network-facing signaling of the SIP trunk service is used to drive multiple logical MTAs that are part of the stimulus network. In a PacketCable NCS context, the logical MTAs support all signaling functions of a physical MTA including the events and signals associated with the line package.

One or more embodiments may enable existing SIP voice equipment to interoperate with Cable operators who are deploying voice services using the NCS protocol. In this manner, Cable operators can continue to use their NCS infrastructures with zero to little investment in SIP technologies, and they can adopt the latest SIP voice equipment to offer new intelligent services to their subscribers with little overhead, thus new revenue streams may expand quickly.

In view of the description herein, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A Session Initiation Protocol (SIP) gateway, comprising:
   a trunk service unit configured to provide session initiation protocol (SIP) service to at least one subscriber equipment in a subscriber network, each subscriber equipment having an associated subscriber equipment identifier, the trunk service unit providing subscriber-facing signaling to communicate with the subscriber network and network-facing signaling to communicate with a stimulus-based network; and
   a plurality of logical multimedia terminal adapters (L-MTA), each in communication with the trunk service unit and having a logical interface implemented with general purpose hardware and programmable code for exchanging messages with an external logical object to emulate signals, the plurality of L-MTAs associated with the stimulus based network and configured to obtain service from a call management server (CMS) in the stimulus-based network, each L-MTA having an associated L-MTA equipment identifier, the network-facing signaling of the trunk service unit being used to control the plurality of L-MTAs,
   wherein a communication session is created with the subscriber equipment and the CMS as participants when the subscriber equipment is mapped to an associated L-MTA, and wherein once the communication session is established media data is enabled to pass directly from the subscriber equipment to a media termination point in the stimulus network.

2. The SIP gateway of claim 1, wherein the subscriber equipment is a telephone and the subscriber equipment identifier is a telephone extension.

3. The SIP gateway of claim 1, wherein a plurality of L-MTAs are grouped together to present a SIP trunk service to the subscriber network.

4. The SIP gateway of claim 1, wherein each subscriber equipment is controlled by the stimulus network by using the network signaling received by the associated L-MTA to modify an SIP session associated with the subscriber equipment.

5. The SIP gateway of claim 1, wherein at least one user initiated change to a SIP session is communicated to the stimulus network via at least one event generated by the L-MTA.

6. The SIP gateway of claim 1, wherein the establishment of the communication session is based on a request from at least one of the subscriber equipment or the CMS.

7. The SIP gateway of claim 1, wherein towards the subscriber equipment the communication session is manifested as one of an SIP session or an SIP service trunk.

8. The SIP gateway of claim 1, wherein the stimulus based network supports at least one of network based call signaling (NCS) or media gateway control protocol (MGCP).

9. The SIP gateway of claim 8, wherein when the stimulus based network supports network based call signaling (NCS), each L-MTA supports at least one of events or signals associated with an associated NCS line package.

10. The SIP gateway of claim 8, wherein when the stimulus based network supports network based call signaling (NCS), each L-MTA supports all signaling functions of a physical multimedia terminal adapter (P-MTA).

11. The SIP gateway of claim 1, wherein the stimulus based network supports network based call signaling (NCS) towards the L-MTA and a communication session is manifested as an NCS session.

12. A method, comprising:
provisioning service with a plurality of logical multimedia terminal adapters (L-MTA) within a Session Initiation Protocol (SIP) gateway, each L-MTA within the SIP-gateway having a logical interface implemented with general purpose hardware and programmable code for exchanging messages with an external logical object to emulate signals, each L-MTA being associated with a subscriber equipment in a subscriber network, each L-MTA having an L-MTA identifier and each subscriber equipment having a corresponding subscriber equipment identifier, each L-MTA being configured to obtain service from a call management server (CMS) in a stimulus based network;
mapping the subscriber equipment to the associated L-MTA; and
establishing a communication session between the subscriber equipment in the subscriber network and the CMS in the stimulus based network,
wherein a communication session is created with the subscriber equipment and the CMS as participants when the subscriber equipment is mapped to an associated L-MTA, and wherein once the communication session is established media data is enabled to pass directly from the subscriber equipment to a media termination point in the stimulus network.

13. The method of claim 12, wherein the subscriber equipment is a telephone and the subscriber equipment identifier is a telephone extension.

14. The method of claim 12, wherein the communication session comprises the subscriber equipment participating in a session initiation protocol (SIP) session.

15. The method of claim 14, wherein each subscriber equipment is controlled by the stimulus network by using the network signaling received by the associated L-MTA to update an SIP session associated with the subscriber equipment.

16. The method of claim 14, wherein at least one change to the SIP session is communicated to the stimulus network via at least one event generated by the L-MTA.

17. The method of claim 14, wherein the establishment of a communication session is based on at least one of a request from the SIP user equipment or the CMS.

18. The method of claim 17, wherein towards the subscriber equipment the communication session is manifested as one of an SIP session or an SIP service trunk.

19. The method of claim 12, wherein the stimulus based network supports at least one of network based call signaling (NCS) or media gateway control protocol (MGCP).

20. The method of claim 19, wherein when the stimulus based network supports NCS, each L-MTA supports all signaling functions of a physical multimedia terminal adapter (P-MTA) including at least one of the events or signals associated with a line package.

* * * * *